United States Patent [19]

Kubacak et al.

[11] Patent Number: 5,284,297
[45] Date of Patent: Feb. 8, 1994

[54] ROADSIDE SPRAYING APPARATUS FOR MINIMIZING DRIFT

[75] Inventors: Johnny L. Kubacak, Jourdanton; Gerald C. Gebheim, Pleasanton, both of Tex.

[73] Assignee: Cibolo Manufacturing Company, Inc., Jourdanton, Tex.

[21] Appl. No.: 393,076

[22] Filed: Aug. 9, 1989

Related U.S. Application Data

[63] Continuation of Ser. No. 70,044, Jul. 6, 1987, abandoned, which is a continuation-in-part of Ser. No. 722,411, Apr. 10, 1985, Pat. No. 5,007,585.

[51] Int. Cl.$^5$ ................................ B05B 1/08
[52] U.S. Cl. ..................... 239/102.1; 239/161; 239/170; 239/176; 239/288.3; 239/562
[58] Field of Search ............. 239/160, 161, 162, 164, 239/169, 170, 176, 102.1, 102.2, 288, 288.3, 288.5, 562, 101

[56] References Cited

U.S. PATENT DOCUMENTS

| | | | |
|---|---|---|---|
| 1,102,354 | 7/1914 | Pougnet | 239/DIG. 1 |
| 2,432,309 | 12/1947 | Gore | 239/164 |
| 2,596,390 | 5/1952 | Essick | 239/164 |
| 2,722,453 | 11/1955 | Moore | 239/160 |
| 2,899,138 | 8/1959 | Williamson | 239/161 |
| 2,995,307 | 8/1961 | McMahon | 239/161 |
| 3,285,516 | 11/1966 | Waldrum | 239/102.1 |
| 3,369,754 | 2/1968 | Wolford | 239/DIG. 1 |
| 3,831,848 | 8/1974 | Cook | 239/288.5 |
| 4,252,274 | 2/1981 | Kubacak | 239/176 |

FOREIGN PATENT DOCUMENTS

| | | | |
|---|---|---|---|
| 508283 | 12/1954 | Canada | 239/176 |
| 535493 | 10/1931 | Fed. Rep. of Germany | 239/162 |
| 567218 | 2/1945 | United Kingdom | 239/162 |
| 895023 | 4/1962 | United Kingdom | 239/172 |

*Primary Examiner*—Andres Kashnikow
*Attorney, Agent, or Firm*—Donald R. Comuzzi

[57] ABSTRACT

An apparatus for roadside spraying of herbicides or other liquids in a manner which ensures uniform application of the herbicide without resorting to atomization of the sprayed liquid. The apparatus provides means for uniformly applying the herbicide in a plurality of swaths at different distances from the spraying apparatus. The apparatus uses a means for vibrationally altering the directions of the sprayed liquid streams to ensure uniform coverage. The direction altering means allows the amplitudes of the direction alterations to vary in accordance with the target distance of sprayed liquid stream.

15 Claims, 5 Drawing Sheets

ROADSIDE SPRAYING APPARATUS FOR MINIMIZING DRIFT

CROSS REFERENCE TO RELATED APPLICATION

This application is a continuation of co-pending application Ser. No. 07/070,044, filed on Jul. 6, 1987, now abandoned, which application was a continuation-in-part application of Applicant's co-pending application Ser. No. 722,411, filed on Apr. 10, 1985, now U.S. Pat. No. 5,007,585.

BACKGROUND OF THE INVENTION

The present invention relates to an apparatus for spraying of liquids. More particularly, the present invention is directed to a roadside spraying apparatus which minimizes atomization and resulting drift of sprayed herbicides or other liquids, mounted on a detachable frame fixed to a vehicle, and controllable by the operator of the vehicle by means of a control panel, which panel regulates the flow of the liquids as well as the direction in which the liquids are sprayed.

Many state highway departments, counties and cities, have for several years been mechanically cutting undesirable weeds, grass and brush in their right-of-ways. However, while such cutting has been primarily accomplished by hand labor or mechanical means, it can be costly and time consuming. In order to minimize these problems, many publicly funded organizations have attempted to spray their right-of-ways with herbicides that would control the undesirable plant growth.

Herbicides used primarily for control of broadleaf weeds and some unwanted grasses are used extensively on the right-of-way, leaving desirable grasses alive for erosion control. These herbicides, such as MSMA and 2-4-D, are termed selective since they do not kill the desirable grasses. Other herbicides used primarily for control of vegetation on shoulders and in the roadway are intended to kill all vegetation and hopefully prevent its regrowth for some period of time. Such herbicides are termed residuals. Other liquids, including fertilizers, may also be advantageously applied along a roadway; however, since application of liquid herbicides is more common, Applicant concentrates this discussion upon the application of herbicides.

Such application almost invariably involves spraying a liquid from an apparatus comprising some type of nozzle. As liquid is sprayed from a moving nozzle, it is generally applied to strip-like areas of ground called swaths. A swath, in this context, also refers to the spray pattern produced by the nozzle and applied to the corresponding strip of ground.

The equipment which has been used for roadside spraying of herbicides in the past has generally been of three common types. Handgun-type sprayers are still in common use today for lack of anything with more versatility. Another common type of equipment comprises a long boom extending out from the side of the vehicle and across the right-of-way. An example of such a long boom is shown in U.S. Pat. No. 2,995,307 issued to J. J. McMahon. Another has been the use of an off-center nozzle mounted to the side of the truck. The use of the off-center nozzle is discussed further below.

The long-extending boom has been used widely because of its ability to reach 25 to 30 feet into the right-of-way. Some designs have provided the boom in sections to give the operator more flexibility as to where he could spray the herbicide. This has also allowed the operator to save chemicals. This type of unit, however, does not lend itself to many right-of-way applications because of hills, back slopes and obstructions in the areas to be sprayed. Common obstructions including trees, bluffs, road signs and the like are a major problem. The extended boom is vulnerable to contact with such obstructions causing extensive down time and delays accompanied by losses in production. It is also very expensive to replace such booms.

Hydraulic cylinders mounted along the extended boom can be utilized for raising the boom over obstructions but may make herbicide application even more cumbersome. Upon encounter obstructions, the driver may have to slow the speed of the vehicle to raise the boom. The slower vehicle speeds will likely be accompanied by increased concentration of applied herbicides. The raising of the boom, furthermore, increases the distance which the herbicide must be sprayed before contacting the roadside area at which it is targeted. This increase in distance consequently decreases the precision of the application since there is a greater chance that wind and other natural forces will cause the herbicide to drift off-target. The uniformity of the herbicide application may likewise be affected. In some situations, it is necessary to use two operators to operate a long-boom sprayer. This increases the costs due to the extra labor required. Also, long boom apparatuses generally require the vehicle to have greater gross vehicle weight since an extended spray boom may require heavier axles and generally heavier duty vehicles for support.

The off-center nozzle, in many cases, has advantages over the long booms. The operator of the off-center nozzle can spray without worrying about obstructions in the right-of-way except for those immediately beside the vehicle. In the event that protective measures are not taken to guard against such immediately adjacent obstructions, however, damage to the nozzle can occur upon encountering an obstacle immediately adjacent the roadway. The off-center nozzle can be mounted anywhere to the side of the vehicle and the spray pattern can cover an area beginning immediately beside the truck and extending from 10 to 30 feet out into the right-of-way. Wind velocity tends to dramatically affect the distance, however, and in such circumstances the spray might not extend past 10 to 15 feet from the vehicle. This type of nozzle also does not give the operator much versatility to place a herbicide only in selected areas existing across the right-of-way. In practice, the weeds are often in spotted areas lying 20 to 40 feet away from the spray truck and the operator has no way to get the herbicide to the target, especially if the wind velocity overpowers the spray. The operator also, in certain situations, needs to spray the herbicide beyond undesirable, taller growing vegetation, but the taller vegetation might prevent the spray from reaching the vegetation beyond. This may cause excessive amounts of herbicide to be unnecessarily used, which may increase the costs of the spraying program and may also overtreat some of the vegetation causing undesirable results.

The same problems also exist with controlling undesirable brush. A long extending boom is not often used for this purpose. Generally, the use of a handgun and the off-center spraying means are used in such situations. Spotted applications to the soil under the undesirable brush with the use of a handgun, spraying specially selected herbicides, provide easy control of brush. In such situations, rain carries the chemical herbicide into the root zone to be picked up by the brush. The herbicide can subsequently interfere with the natural processes in the plant causing its ultimate death. However, spotted application of such herbicides by handguns is slow, which increases application cost and, in most cases, the herbicide is overapplied, resulting in excessive killing of low growing desirable ground cover.

With the development of new herbicides, especially new selective herbicides, it has become more important to eliminate the problem encountered with extended booms, off-center nozzles and handguns. In the case of certain chemicals, it is necessary to apply them from 1 to 1½ quarts per acre or 43,560 square feet. In the case of other currently used chemicals, it is necessary to apply them at 4 to 8 ounces to control more susceptible tall growing vegetation. Greater amounts of these herbicides and others may kill or damage desirable vegetation and may consequently leave partially to totally bare ground. Such problems often prevent many highway departments, counties and cities from going into vegetation management programs with the new herbicides to eliminate the more costly program of hand labor and mechanical cutting. It is, therefore, an object of the present invention to provide for controlling the composition and concentration of herbicides during their sprayed application. Concentration, in this context, refers to the amount of herbicide sprayed per unit area of ground while composition refers to the type or types of herbicide.

Furthermore, as the concentration of the herbicide applied at each elemental target area is critical, controlling the uniformity of the application is advantageous. Poorly controlled, non-uniform applications result in greater concentrations being applied to some elemental target areas than others. This forces a herbicide treatment program to be limited by the effects of the greater elemental concentrations in order to avoid adverse effects of over-treatment at those elemental areas. The resulting quality of the overall herbicide treatment program is thus constrained and must fall short of optimization. It is, accordingly, an object of the present invention to provide an apparatus for roadside application of herbicides while also controlling the uniformity of the application.

In many applications it is also advantageous to apply different herbicides or different concentrations of herbicides to locations at different distances from the roadside. For instance, it may be desired to apply a herbicide to an area immediately adjacent to a roadway which will kill all vegetation. At areas further from the roadway, however, it may be desired to apply a selective herbicide to kill broadleaf weeds but leave low growing grass unharmed. Furthermore, an operator of a roadside spraying apparatus will want to apply different herbicides to different areas as roadside vegetation changes during a single pass. Therefore, any roadside spraying apparatus allowing the application of different herbicides to different areas must not have any time lags between the time of the decision to apply a different herbicide and the time of the actual application of that herbicide. Therefore, it is an object of one embodiment of the present invention to enable an operator to apply different herbicides in different swaths with little or no time delay.

Additionally, when applying herbicides, it is often critical to confine the application to the area which is intended to be treated in order to avoid undesirable effects on adjacent vegetation, waterways, livestock, or other items which are not targets of the herbicide treatment. Previous spraying apparatuses utilize angle spray nozzles which spray liquid in an atomized spray. Such atomization enables uniformity of treatment and treatment of greater areas per single nozzle; however, in the process of atomization, various sized liquid droplets are randomly created. The smaller sized liquid droplets tend to drift beyond the area of application, and undesirable effects may result. The present invention is directed at minimizing this problem of drift without sacrificing uniformity and while optimizing other advantageous characteristics of a roadside sprayer.

By spraying liquid herbicide in aerial streams, some prior art has minimized such atomization and drift. For the purposes of this invention, aerial streams are airborne streams of liquid which are virtually unaccompanied by atomized droplets. Nozzles which spray liquids in such aerial streams are called straight stream nozzles, or zero degree angle nozzles. Stream spraying, unfortunately, creates problems of uniformity and breadth of possible application. For instance, an unmodified single stream being sprayed from a moving vehicle would apply liquid to only a very narrow streak along the roadside. Multiple streams enable application to broader roadside areas, but tend to apply liquid nonuniformly in multiple parallel narrow streaks along the roadside. Uniform application of herbicides is necessary in order to optimize performance and economic considerations of a roadside spraying operation. Such streaked application produces nonuniform concentrations of the herbicide and, thus, diminishes the desired effect of the herbicide. Other inventions have attempted to address this problem by rapidly altering the direction of aerial streams but have fallen short of the goal of uniform application for numerous reasons. It is, therefore, another object of the present invention to provide an apparatus and method for applying liquid uniformly to a broad roadside while minimizing atomization and drift.

It is also an object of the present invention to provide a method and apparatus for spraying liquid in multiple aerial streams which are scattered in a manner that optimizes uniformity of the application of the liquid on a roadside throughout the course of application and across the breadth of the targeted roadside.

As right-of-ways may be quite broad, it is another object of the present invention to provide vehicle mountable apparatus for spraying herbicide onto swaths along a roadway, which apparatus maximizes the width of an aggregate swath treatable at one time.

It is yet another object of the present invention to provide for protection of a roadside spraying apparatus when encountering an obstruction along a roadway.

SUMMARY OF THE INVENTION

The present invention provides for controlled application of herbicides by a mechanized apparatus mountable to a mobile vehicle. The present invention may incorporate a plurality of straight stream nozzles combined with direction altering means in a manner which optimizes performance of a roadside sprayer. In one embodiment, each of the straight stream nozzles may be pivotally adjusted to selectively direct the application of the herbicide in the form of a plurality of swaths located at different ranges from the apparatus. In an alternate embodiment, the nozzles are fixed so as to direct streams at the appropriate angles to produce the desired swaths. The nozzles are mounted upon a spray head which may be remotely operated by an operator of the vehicle to change the inclination of the direction of spray.

The variation in nozzle ranges also enables variation in the number of different swaths applied at any one time as is advantageous in certain applications. This variation is achieved by connecting separate groups of nozzles to separately controllable fluid supplies. Since each group of nozzles produces a different swath, by controlling the separate fluid supplies, a variable pattern of swaths may be produced at any one time.

Additionally, the present invention provides for spraying liquid in aerial streams rather than atomized sprays in order to minimize atomization and drift. By vibrationally altering the direction of the sprayed liquid streams, the present invention scatters the streams thereby avoiding streaked applications and achieving greater uniformity of coverage over a larger area while still minimizing atomization and drift. The alterations in the direction of the aerial stream are made approximately perpendicular to the general direction in which the vehicle travels. The perpendicular aspect of these alterations minimizes wasted energy and unnecessary stresses since a component of vibration in the direction of travel is useless.

The present invention also provides for uniform application of herbicides onto a roadside throughout the course of the application. This feature is enabled in part by mounting each of the nozzles that are vibrated onto a common support which, in turn, is vibrated. This configuration creates vibrational alterations in the directions of the emitted streams which are in phase with each other. Such vibrations create greater uniformity in the spray of herbicides than would otherwise be obtained.

In order to produce a stream which will travel to the distances required by most road spraying applications, a certain minimum size stream is required. This is because a smaller stream will dissipate and fall to the ground before reaching the target. The dissipation occurs due to gravitational forces and drag forces acting on the horizontally traveling stream of water. Even a large stream will dissipate upon reaching a certain distance, however. This natural scatter may be used to advantage since it results in a uniform application of herbicide to the target area even without vibrationally altering the directions of the streams.

The natural scatter described above also results in the herbicide being applied over a larger area. In order to equalize the herbicide content of both near and far swaths, near swaths can be composed of either fewer streams or streams of lesser diameter. The latter solution is preferable because it results in more uniform application of herbicide. This means using nozzles of a smaller size for near swaths than for far swaths. In order to attain even greater uniformity of application, the preferred embodiment of the present invention uses a greater number of even smaller size nozzles for near swaths.

Since aerial streams tend naturally to scatter at greater distances from their respective nozzles, the present invention optimizes uniformity of herbicide application by incorporating means to vary the magnitude of the vibrational alterations in inverse proportion to the aerial distance the stream travels before reaching its target of application. This gradual increase in vibration is incorporated to compensate for the gradual decrease of natural scatter corresponding to decreasing distances which different streams will travel before contacting the roadside. This graduated degree of vibrational alterations is enabled in the preferred embodiment by pivoting the common vibrating support for the nozzles. Such pivoting provides for diminished vibrations nearer to the pivotal point and larger vibrations at greater distances from the pivot point. The nozzles which are vibrated more can, in turn, be directed at closer ranges where natural scatter is diminished.

These and other advantages of the present invention will become evident to those skilled in the art upon a reading of the following detailed description of the preferred embodiment taken in conjunction with the accompanying drawings and claims.

DETAILED DESCRIPTION OF THE PREFERRED EMBODIMENT

Referring to FIGS. 1 through 5 of the drawings, there is shown a preferred embodiment of the invention. The embodiment discloses a specialized nozzle configuration and support for spraying a substantial area while minimizing atomization of the sprayed liquid.

Figure 1:
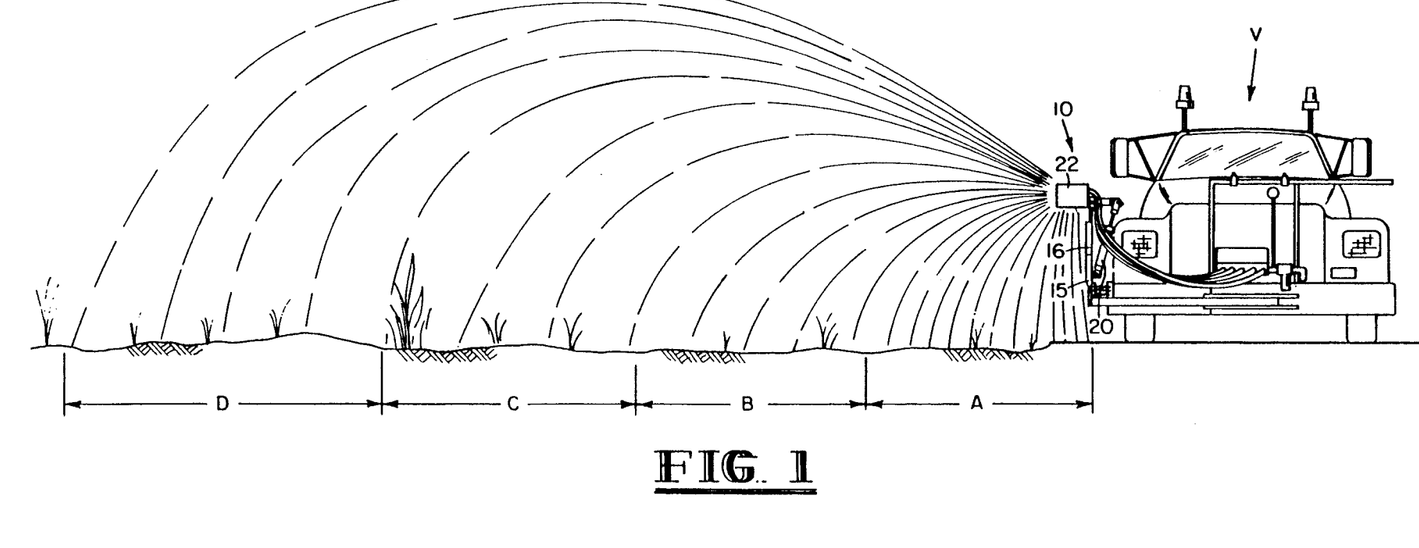
FIG. 1 shows the spraying apparatus of the invention mounted on a vehicle showing the laterally adjacent swaths corresponding to different sets of the nozzles.

The spraying apparatus of FIG. 1 is adapted to be used upon a motor vehicle in connection with liquid supply means and pumping means. U.S. Pat. No. 4,315,602 discloses liquid supply means and pumping means as tanks and pumps which may be used in connection with this invention. The disclosure of this patent is incorporated herein.

Figure 2:
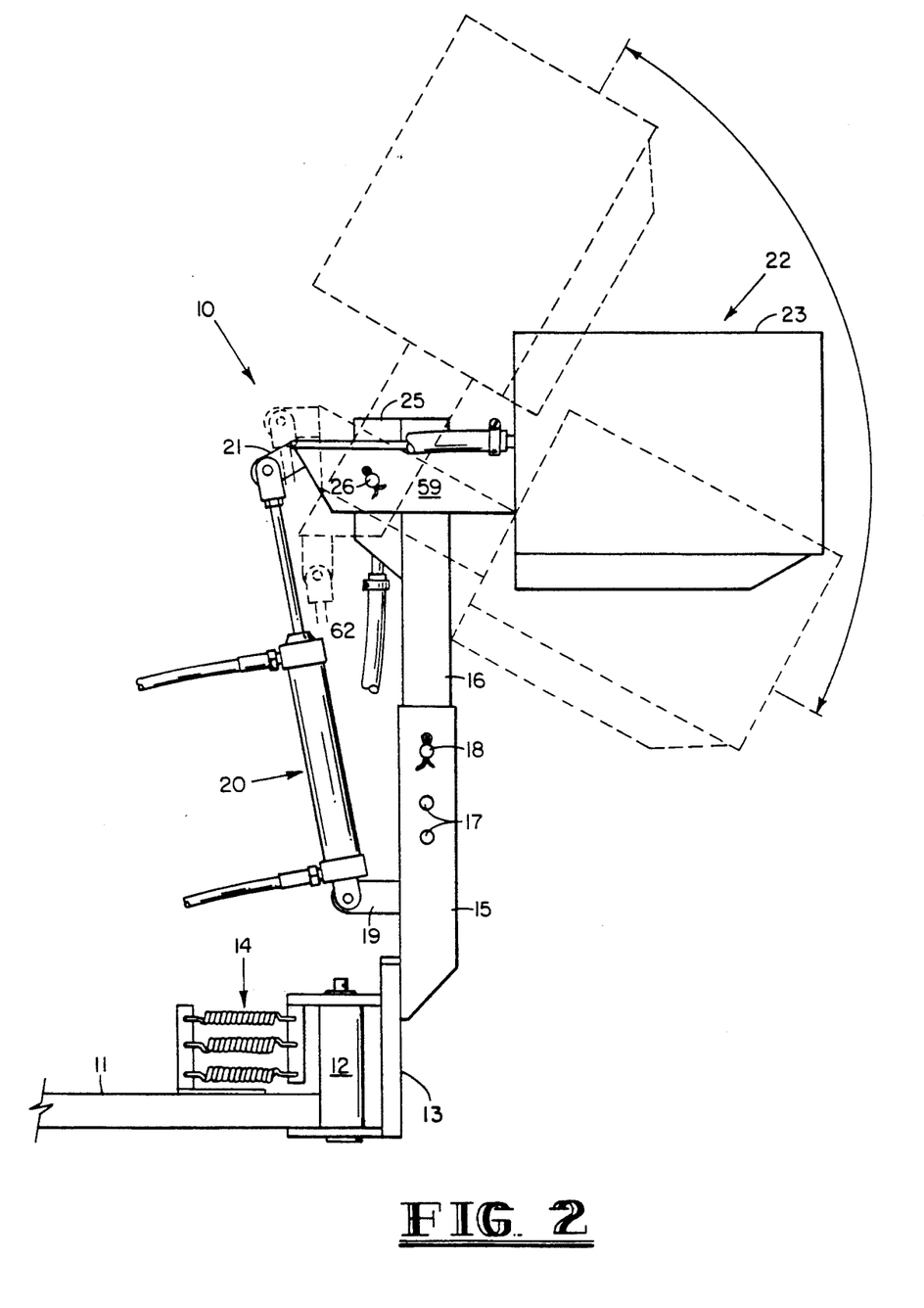
FIG. 2 is a side view showing the spraying apparatus of the invention.

Referring particularly to FIG. 2, there is shown a spraying apparatus 10 which is mounted on a motor vehicle V as shown in FIG. 1. Spraying apparatus 10 includes a main support beam 11 which is mounted to the front of the vehicle V in a manner such as disclosed in U.S. Pat. No. 4,315,602. A journal 12 is connected with the beam 11. A pivot mechanism including a bifurcated member 13 pivoted to the journal and maintained in position by spring means 14 as also disclosed in U.S. Pat. No. 4,315,602.

A first vertical beam 15 is connected to the bifurcated member 13. The vertical beam 15 is in the form of a square channel member for receiving post 16. A plurality of apertures 17 receive the removable pin 18 which provides vertical adjustment of the post 16.

Figure 3:
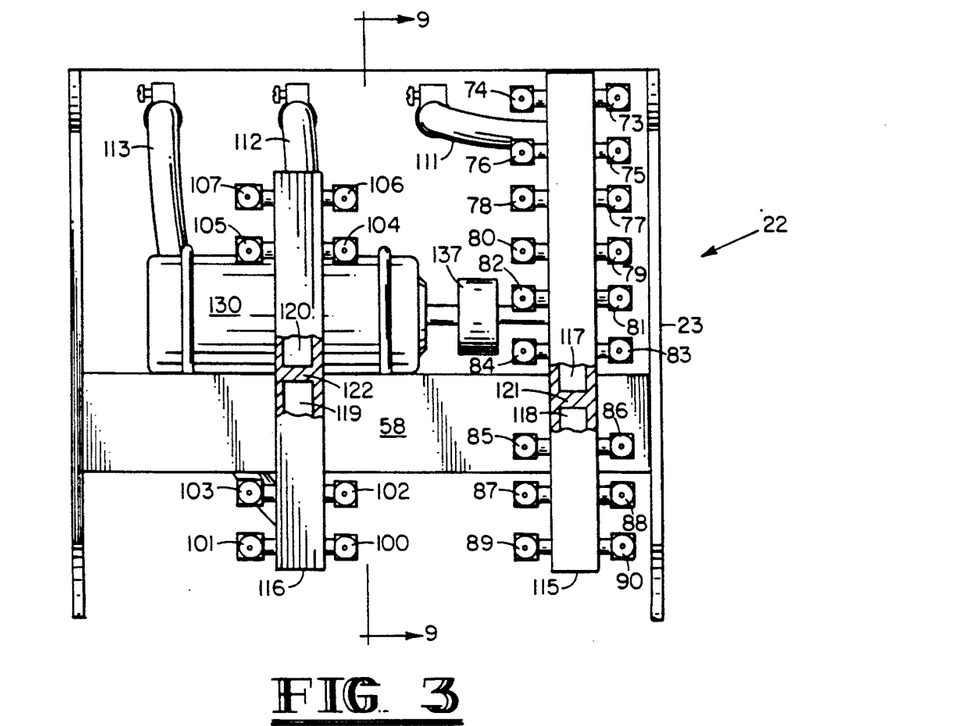
FIG. 3 shows the spray head of the invention in a front view.

Secured to the vertical beam 15 is a support arm 19. A cylinder means 20 which may be either electric, air, or hydraulic or other remotely controlled power means is connected at one end to the support arm 19 and at its upper end to a support arm 21. The support arm 21 is connected to a spray head 22. Spray head 22 comprises a plurality of nozzles and provides a means for supporting the nozzles. Spray head 22 also comprises a generally "U" shaped shield 23 for protecting the nozzles 73 through 107, which are positioned between the legs of the "U", from potential impact and resulting damage by common obstructions such as roadside mailboxes. Shield 23 is rigidly connected to rectangularly shaped frame 59. The post 16 includes a pivot bracket 25 which is secured to the post 16. The rectangular frame 59 is pivotally connected to the pivot bracket 25 by pivot pin 26. The support arm 21 is connected to the rectangular frame 59. As will be apparent, extension and retraction of the hydraulic cylinder means 20 will cause the spraying means 22 to pivot as shown in broken lines in FIG. 2. Referring to FIG. 3, nozzle supporting member 58 of rectangular frame 59 is also connected to shield member 23 to improve stability and support. Upright member 61 is rigidly connected to nozzle supporting member 58 as shown in FIG. 4.

Figure 4:
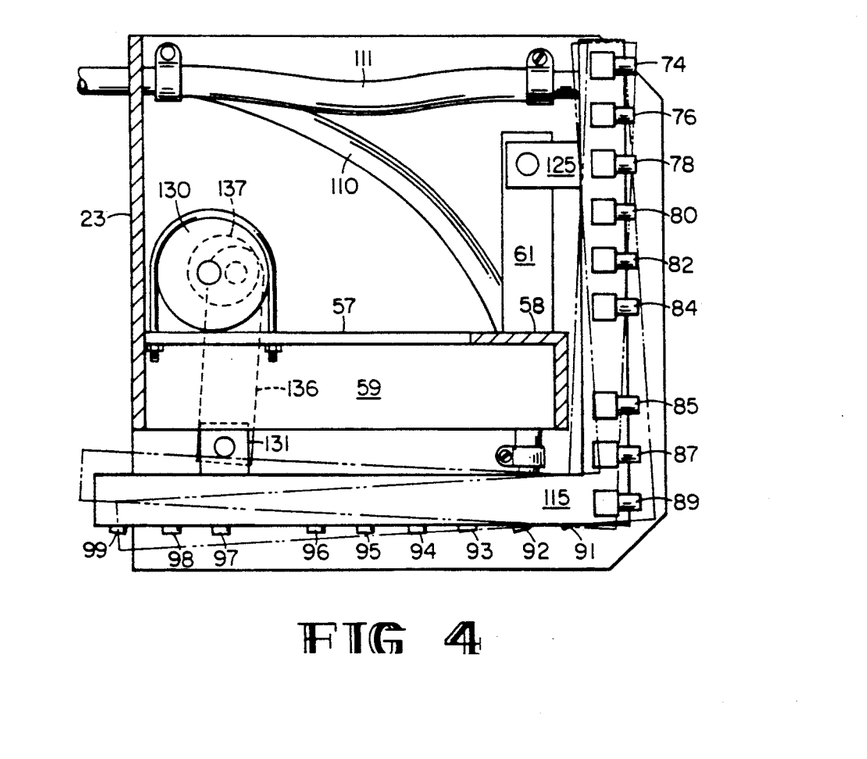
FIG. 4 is a side view of the spray head of the invention taken along line 9—9 in FIG. 3.
Figure 5:
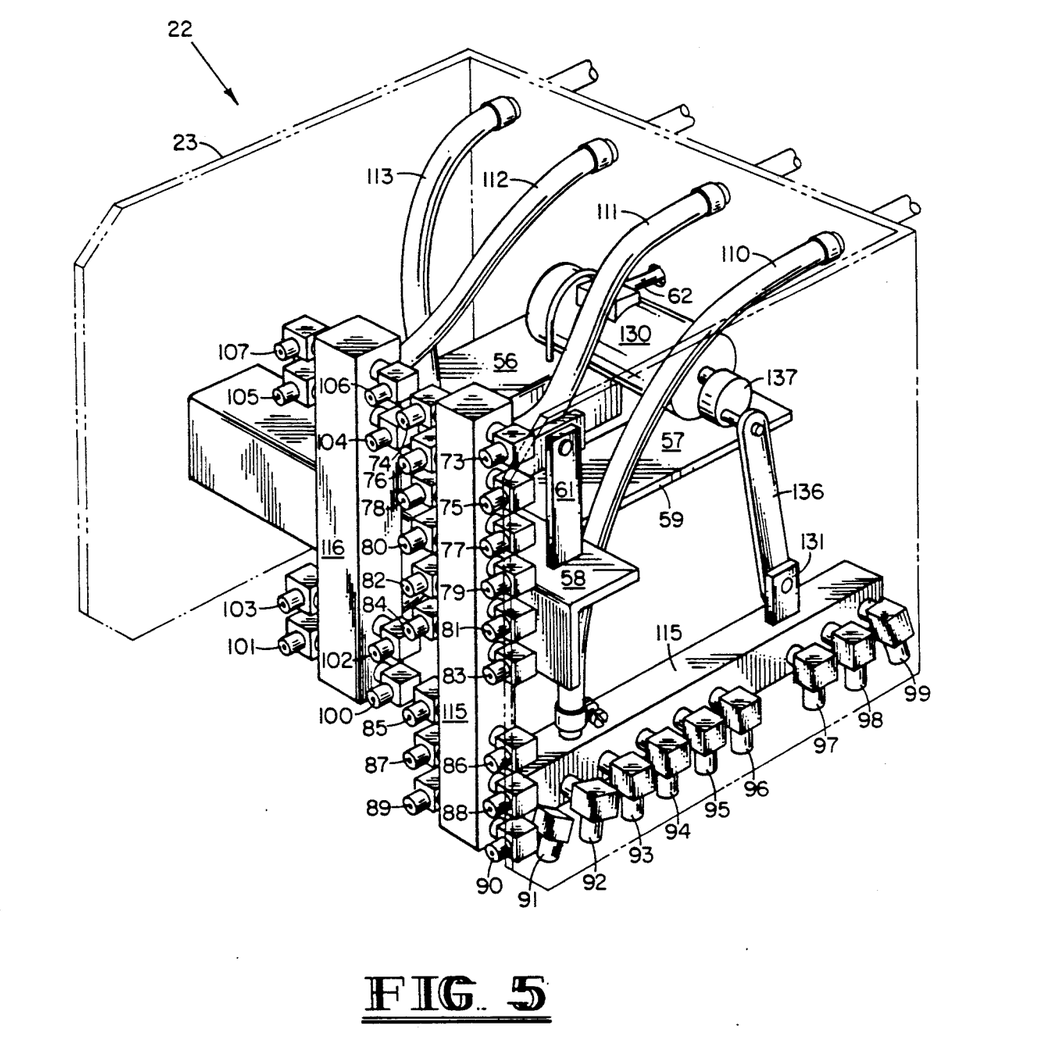
FIG. 5 is a bird's-eye perspective view showing the spray head of the invention.

Referring now to FIGS. 3, 4 and 5, spray head 22 further comprises a plurality of nozzles 73 through 107. Each of nozzles 73 through 107 are provided with orifices (not numbered), which orifices are in fluid connection with fluid supplies through flexible tubing 110, 111, 112 and 113 in a manner such as disclosed in U.S. Pat. No. 4,315,602. Additionally, each of nozzle 73 through 107 is a straight stream nozzle for spraying liquid as aerial streams. The nozzles 73-107 are positioned to spray streams in a direction approximately perpendicular to the length of nozzle support member 58.

Each of nozzles 73 through 99 are connected to square tubing 115 and are pivotally adjustable with respect to square tubing 115. Square tubing 115 encloses two independent chambers 117 and 118 which are separated by dividing partition 121. Chamber 117 is in flow communication with fluid supply means through flexible tubing 111. Chamber 118 is in flow communication with fluid supply means through flexible tubing 110. Nozzles 100 through 107 are connected to square tubing 116 and are pivotally adjustable with respect thereto. Square tubing 116 encloses two independent chambers 119 and 120, which chambers 119 and 120 are separated by internal dividing partition 122. Chamber 119 is in flow communication with fluid supply through flexible tubing 113. Chamber 120 is in flow communication with fluid supply through flexible tubing 112.

Tab 125 is rigidly connected to square tubing 115 and is pivotally connected to upright member 61, thereby enabling square tubing 115 to pivot about upright member 61. Tab 131 is rigidly connected to square tubing 115. Square tubing 116 is rigidly connected to nozzle support member 58.

Nozzles 85 through 99 are grouped into a first set of nozzles; nozzles 73 through 84 are grouped into a second set of nozzles; nozzles 100 through 103 are grouped into a third set of nozzles; and nozzles 104 through 107 are grouped into a fourth set of nozzles. Accordingly, each set of nozzles is provided with orifices that communicate with a respectively different chamber 117 through 120. Referring to FIG. 5, the first set of nozzles 85 through 99 are oriented to collectively spray a first swath A of the right of way. The second set of nozzles 73 through 84 are oriented to collectively spray a second swath B on the right-of-way. The third set of nozzles 100 through 103 are oriented to collectively spray a third swath C on the right-of-way. The fourth set of nozzles 104 through 107 are oriented to collectively spray a fourth swath D along the right-of-way. The orientation of the nozzles 73 through 107 within each set determines the width of the corresponding swath A through D and determines the distance from the side of the vehicle V at which distance the corresponding swath A through D is located.

In order to produce swaths A through D of uniform size and composition, nozzles 73 through 84 are of larger diameter than nozzles 85 through 99. Nozzles 100 through 107 are of still larger diameter in order to produce streams which will travel the required distance before dissipating.

Referring again to FIG. 5, means for vibrationally altering the direction of the liquid being sprayed from nozzles 73 through 99 is provided, in part, by electric motor 130. Eccentric 137 is rigidly connected to the shaft of motor 130 and motor 130 drives eccentric 137. Eccentric 137 is pivotally connected to link 136 which, in turn, is pivotally connected to tab 131. When motor 130 is in operation, eccentric 137 rotates, transmitting reciprocating motion to link 136 and tab 131. The reciprocating motion vibrates square tubing 115 about its pivotal connection to upright member 61. The directions in which liquid streams flow from nozzles 73 through 107 are accordingly vibrationally altered. Motor 130 is rigidly connected to brackets 56 and 57 and is empowered by electricity from electrical wires within conduit 62. Although the direction altering means comprises a rotating motor 130 in the preferred embodiment, a solenoid-type mechanism (not pictured) can be incorporated for vibrationally altering the direction of liquid spraying in an alternative embodiment (not pictured).

The pivotal connection of square tubing 115 to upright member 61 effectively provides means for increasing the amplitude of the vibrational movements of the nozzles according to their distance from the pivotal connection. For example, nozzles 73 and 74, which of those nozzles attached to square tubing 115 are directed at the elemental swath located the farthest distance from spray head 22, are vibrated only slightly; whereas, nozzle 99 is vibrated with the greatest amplitude of all of nozzles 73 through 99. Although square tubing 115 has an "L" shape in the preferred embodiment, it has a linear shape in an alternative embodiment (not pictured). This alternative embodiment would modify the relationship of movements between nozzles 73 through 99. Another alternative embodiment (not pictured) provides for vibrating each of the nozzles 73 through 99 with equal amplitude. This alternative is enabled by replacing the pivotal connection of square tubing 115 to upright member 61 with appropriate slideable connections enabling reciprocating motion of square tubing 115.

Furthermore, mounting nozzles 73 through 99 on square tubing 115, which is a common support for nozzles 73 through 99, provides means for maintaining all of the vibrational alterations in phase with each other.

Swaths C and D are assumed, in this preferred embodiment, to be located far enough from the vehicle that the streams will naturally scatter to produce uniform coverage. Thus, no vibrating means are provided for square tubing 116.

Each of tubings 110 through 113 is connected to the herbicide supply through a separate solenoid-actuated valve. Thus, any or all of swaths A through D may be selected.

Figure 6:
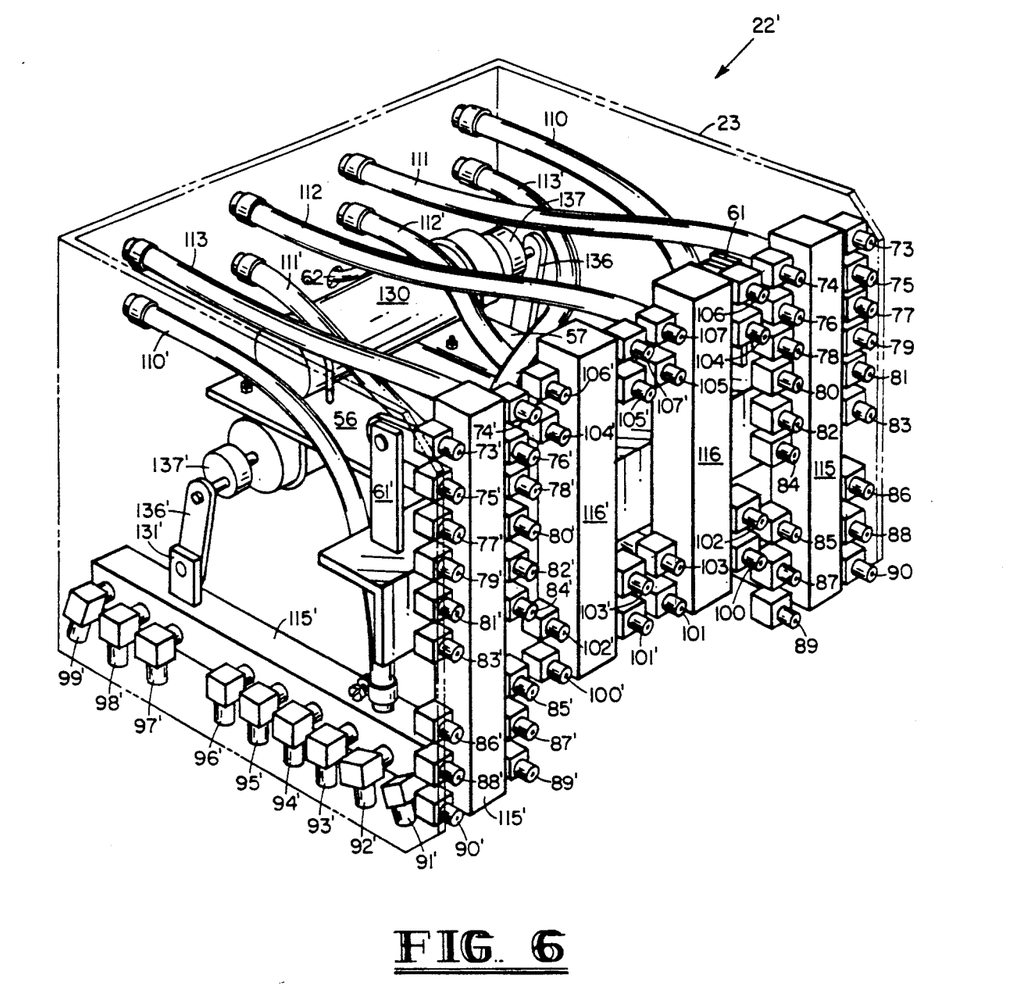
FIG. 6 is a bird's-eye perspective view of an alternative embodiment of the spray head of the invention.

In an alternative embodiment of the present invention, shown in FIG. 6, square tubing 116 and 115, nozzles 73 through 107, flexible tubings 110 through 113, and motor 130 are duplicated within shield 23. Referring to these duplicated components with primes following the corresponding number, flexible tubings 110' through 113' are connected to a herbicide supply separate from the one connected to flexible tubings 110 through 113. This allows the operator to select one or both herbicides to apply to a given swath. Furthermore, since separate nozzles are used for the separate supplies, there is no time delay involved when switching or adding different herbicides to the swath.

As each of nozzles 73 through 99 are pivotally adjustable with respect to square tubing 115 and as each of the nozzles 100 through 107 are pivotally adjustable with respect to square tubing 116, the operator of the apparatus is provided with means for varying the concentrations of herbicides applied at different ranges from the spray head 22. Corresponding to widths of swaths in which concentration is desired to be decreased, the operator will pivotally adjust the orientation of the pertinent nozzles to increase the separation between their respective elemental swaths, thereby decreasing the applied concentration of herbicides. In an alternative embodiment, nozzles 73 through 107 are simply orifices in square tubing 115 and 116 oriented in directions appropriate to produce the desired swaths.

From the foregoing description and illustration of this invention, it is apparent that various modifications can be made by rearrangement of the elements or by substitution to produce similar results. It is, therefore, the desire of the Application not to be bound by the description of this invention as contained in this specification but to be bound only by the claims as appended hereto.

We claim:

1. A spraying apparatus for spraying liquids to the side of a moving vehicle in a plurality of laterally adjacent swaths comprising:
   means mountable on a vehicle for supporting a spray head;
   said spray head including a plurality of sets of spraying means provided with orifices for directionally spraying liquid in aerial streams;
   the spraying means in each set being mounted on the spray head and oriented to collectively spray a predetermined width of swath at a predetermined distance from the side of the vehicle;
   each set communicating with a liquid source through a separate control means for operating each respective set of spraying means as a unit;
   said control means being independently actuatable to selectively deliver liquid to selected sets of spraying means to provide the desired spray pattern and width of coverage; and
   means operatively connected to said spraying means for vibrating the stream flow from said stream spraying means to produce and scatter liquid particles.

2. The apparatus of claim 1 wherein said support means includes means to adjust the angle of inclination of said spray head.

3. The apparatus of claim 2 wherein:
   said spray head includes means for protecting said spraying means from the impact of obstructions which may be encountered by said spray head; and
   said means for adjusting the angle of inclination of said spray head includes remotely controlled power means.

4. The apparatus of claim 1 wherein:
   said means for vibrating comprises a member pivotally connected to said supporting means;
   the spraying means of one of said sets is mounted on said member; and
   said means for vibrating further comprises means for vibrationally pivoting said member about its pivotal connection to said spray head for vibrating those aerial streams directed toward swaths closer to the spray head at a greater amplitude than those directed toward swaths further from the spray head.

5. The apparatus of claim 4 wherein the size and number of orifices are chosen such that each area of ground covered by a swath receives the same concentration of liquid.

6. The apparatus of claim 4 wherein each of said spray means is pivotally connected to said spray head.

7. The apparatus of claim 4 wherein each swath may be produced by a plurality of sets of spraying means and wherein each set of the plurality producing each swath is fluidly connected by independently actuatable control means to a different liquid supply.

8. An apparatus for spraying a liquid while minimizing atomization of the sprayed liquid, comprising:
   means mountable on a vehicle for supporting liquid spraying means;
   a plurality of liquid spraying means mounted on said supporting means said spraying means, provided with orifices for directionally spraying liquid as aerial streams from a side of the vehicle;
   means operatively connected to said liquid spraying means for vibrating the aerial stream to produce and scatter liquid particles;
   said vibrating means further comprising means operatively connected to said vibrating means for maintaining the vibrations of the liquid streams from each of said liquid spraying means in phase with the vibration of liquid streams from each other of said liquid spraying means.

9. The apparatus of claim 8 wherein said vibrating means comprises means for pivoting said spraying means about a pivot point such that liquid streams emitted from orifices located farther from the pivot point are vibrated with greater amplitude than are those form orifices located nearer the pivot point.

10. The apparatus of claim 9 wherein said liquid spraying means are grouped and comprise sets of liquid spraying means and further comprising independently actuatable means for fluidly connecting each set of spraying means with a liquid supply.

11. The apparatus of claim 10 wherein each set of spraying means produces a swath of predetermined width and distance from the vehicle and wherein the orifices of said spraying means are located with respect to the pivot point such that the streams producing swaths at a closer distance from the vehicle are vibrated with greater amplitude than the streams producing swaths at a farther distance from the vehicle.

12. The apparatus of claim 11 wherein the size and number of orifices are chosen such that each area of ground covered by a swath receives the same concentration of liquid.

13. The apparatus of claim 11 wherein each swath may be produced by a plurality of sets of spraying means and wherein each set of the plurality producing each swath is fluidly connected by independently actuatable control means to a different liquid supply.

14. The apparatus of claim 11 wherein said supporting means further comprises means integrally formed with said supporting means for protecting said liquid spraying means from obstructions along the course which the vehicle travels.

15. A spraying apparatus for uniformly spraying a liquid on a swath in a manner which minimizes atomization of the sprayed liquid, comprising:

fluid supply means for supplying said liquid;
a supporting structure;
a plurality of straight stream nozzles connected to said supporting structure in fluid communication with said fluid supply means, different ones of said straight stream nozzles being oriented to spray said liquid on respectively different portions of said swaths; and
means operatively connected to said straight stream nozzles for vibrating the stream flow from said straight stream nozzles in a manner which produces and scatters liquid particles.

* * * * *

(12) REEXAMINATION CERTIFICATE (4519th)

United States Patent
Kubacak et al.

(10) Number: US 5,284,297 C1
(45) Certificate Issued: Jan. 15, 2002

(54) ROADSIDE SPRAYING APPARATUS FOR MINIMIZING DRIFT

(75) Inventors: Johnny L. Kubacak, Jourdanton; Gerald C. Gebheim, Pleasanton, both of TX (US)

(73) Assignee: Cibolo Manufacturing Company, Jourdanton, TX (US)

Reexamination Request:
No. 90/005,483, Sep. 7, 1999

Reexamination Certificate for:
Patent No.: 5,284,297
Issued: Feb. 8, 1994
Appl. No.: 07/393,076
Filed: Aug. 9, 1989

Related U.S. Application Data (63) Continuation of application No. 07/070,044, filed on Jul. 6, 1987, now abandoned, which is a continuation-in-part of application No. 06/722,411, filed on Apr. 10, 1985, now Pat. No. 5,007,585.

(51) Int. Cl.$^7$ .................................. B05B 1/08
(52) U.S. Cl. ................ 239/102.1; 239/161; 239/170; 239/176; 239/288.3; 239/562
(58) Field of Search ............. 239/102.1, 102.2, 239/160, 161, 162, 164, 169, 170, 176, 288, 288.3, 288.5, 562, 101

(56) References Cited

U.S. PATENT DOCUMENTS

| | | | |
|---|---|---|---|
| 1,102,354 A | 7/1914 | Pougnet | 239/550 |
| 2,722,453 A | 11/1955 | Moore | 299/162 |
| 3,285,516 A | 11/1966 | Waldrum | 239/102.1 |
| 3,390,835 A | 7/1968 | Harris | 239/4 |
| 4,018,385 A | 4/1977 | Bruno | 239/381 |
| 4,340,176 A | 7/1982 | Bernard | 239/102.1 |
| 4,728,041 A | 3/1988 | Draxler et al. | 239/754 |
| 4,852,595 A | 8/1989 | Baier et al. | 134/144 |
| 4,944,457 A | 7/1990 | Brewer | 239/242 |
| 5,197,673 A | 3/1993 | Sullivan | 239/102.1 |

FOREIGN PATENT DOCUMENTS

| | | |
|---|---|---|
| DE | 535493 | 7/1930 |

OTHER PUBLICATIONS

Cibolo Mfg. Co., Inc. "Types of Herbicide Applications Made by "Swinglok" ® Sprayers," Cibolo Manufacturing, Inc., Nov. 15, 1980.

Cibolo Manufacturing, Inc. Letter to "Bob Dark, Curry County Noxious Weed Director, Gold Beach, OR," Cibolo Manufacturing, Inc., Apr. 23, 1990.

*Primary Examiner*—David A. Scherbel (57) ABSTRACT

An apparatus for roadside spraying of herbicides or other liquids in a manner which ensures uniform application of the herbicide without resorting to atomization of the sprayed liquid. The apparatus provides means for uniformly applying the herbicide in a plurality of swaths at different distances from the spraying apparatus. The apparatus uses a means for vibrationally altering the directions of the sprayed liquid streams to ensure uniform coverage. The direction altering means allows the amplitudes of the direction alterations to vary in accordance with the target distance of sprayed liquid stream.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 9 is cancelled.

Claims 1, 3, 4, 6–8, 10, 11, 13, 14 and 15 are determined to be patentable as amended.

Claims 2, 5 and 12, dependent on an amended claim, are determined to be patentable.

1. A spraying apparatus for spraying liquids to the side of a moving vehicle in a plurality of laterally adjacent swaths, comprising:

means mountable on a vehicle for supporting a spray head;

said spray head including a plurality of sets of [spraying means] *nozzles* provided with orifices for directionally spraying liquid in aerial streams;

the [spraying means] *nozzles* in each set being mounted on the spray head and *each nozzle in each set being oriented to spray a substantially different portion of a predetermined width of swath at a predetermined distance from the vehicle such that the nozzles in each set* collectively spray *to cover* a predetermined width of swath at a predetermined distance from the side of the vehicle;

each set *of nozzles* communicating with a liquid source through a separate control means for operating each respective set of [spraying means] *nozzles* as a unit;

said control means being independently actuatable to selectively deliver liquid to selected sets of [spraying means] *nozzles* to provide the desired spray pattern and width of coverage; and means operatively connected to said [spraying means] *sets of nozzles* for vibrating the stream flow from said [stream spraying means] *sets of nozzles* to produce and scatter liquid particles.

3. The apparatus of claim 2 wherein:

said spray head includes means for protecting said [spraying means] *sets of nozzles* from the impact of obstructions which may be encountered by said spray head; and said means for adjusting the angle of inclination of said spray head includes remotely controlled power means.

4. The apparatus of claim 1 wherein:

said means for vibrating comprises a member pivotally connected to said supporting means;

the [spraying means] *nozzles* of one of said sets [is] *are* mounted on said member; and said means for vibrating further comprises means for vibrationally pivoting said member about its pivotal connection to said spray head for vibrating those aerial streams directed toward swaths closer to the spray head at a greater amplitude than those directed toward swaths further from the spray head.

6. The apparatus of claim 4 wherein each of said [spray means] *sets of nozzles* is pivotally connected to said spray head.

7. The apparatus of claim 4 wherein each swath may be produced by a plurality of sets of [spraying means] *nozzles* and wherein each set of the plurality producing each swath is fluidly connected by independently actuatable control means to a different liquid supply.

8. An apparatus for spraying a liquid while minimizing atomization of the sprayed liquid, comprising:

means mountable on a vehicle for supporting a liquid spraying means;

*said spraying means comprising* a plurality of liquid spraying [means] *nozzles* mounted on said supporting means, said spraying [means,] *nozzles* provided with orifices for directionally spraying liquid as aerial streams from a side of the vehicle;

means operatively connected to said liquid spraying means for vibrating the aerial stream*s* to produce and scatter liquid particles, *said vibrating means comprising means for pivoting said spraying means about a pivot point such that aerial streams emitted from orifices located farther from the pivot point are vibrated with greater amplitude than those from orifices located nearer the pivot point;* and said vibrating means further comprising means operatively connected to said vibrating means for maintaining the vibrations of the [liquid] *aerial* streams from each of said liquid spraying [means] *nozzles* in phase with the vibration of [liquid] *aerial* streams from each other of said liquid spraying [means] *nozzles*.

10. The apparatus of claim [9] *8* wherein said liquid spraying [means] *nozzles* are grouped and comprise sets of liquid spraying [means] *nozzles* and further comprising independently actuatable means for fluidly connecting each set of spraying [means] *nozzles* with a liquid supply.

11. The apparatus of claim 10 wherein each set of spraying [means] *nozzles* produces a swath of predetermined width and distance from the vehicle and wherein the orifices of said spraying [means] *nozzles* are located with respect to the pivot point such that the streams producing swaths at a closer distance from the vehicle are vibrated with greater amplitude than the streams producing swaths at farther distance from the vehicle.

13. The apparatus of claim 11 wherein each swath may be produced by a plurality of sets of [spraying means] *nozzles* and wherein each set of the plurality producing each swath is fluidly connected by independently actuatable control means to a different liquid supply.

14. The apparatus of claim 11 wherein supporting means further comprises means integrally formed with said supporting means for protecting said liquid spraying [means] *nozzles* from obstructions along the course which the vehicle travels.

15. A spraying apparatus for uniformly spraying a liquid on a *predetermined width of* swath *at a predetermined distance from a vehicle* in a manner which minimizes atomization of the sprayed liquid, comprising:

fluid supply means for supplying said liquid;

a supporting structure;

a plurality of straight stream nozzles connected to said supporting structure *and* in fluid communication with said fluid supply means, [different ones] *each one* of said straight stream nozzles being oriented to spray said liquid on *a* respectively different portion[s] of said *predetermined width of* swath[s] *at the predetermined distance from the vehicle*; and means operatively connected to said straight stream nozzles for vibrating the stream flow from said straight stream nozzles in a manner which produces and scatters liquid particles.

\* \* \* \* \*